(12) United States Patent
Choi et al.

(10) Patent No.: US 6,381,738 B1
(45) Date of Patent: Apr. 30, 2002

(54) METHOD FOR OPTIMIZING CREATION AND DESTRUCTION OF OBJECTS IN COMPUTER PROGRAMS

(75) Inventors: Jong-Deok Choi, Mount Kisco; Manish Gupta, Peekskill, both of NY (US); Mauricio J. Serrano, San Jose, CA (US); Vugranam C. Sreedhar, Whiteplains, NY (US); Samuel Pratt Midkiff, Upper Saddle River, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,140

(22) Filed: Jul. 16, 1999

(51) Int. Cl.⁷ ................................................ G06F 9/45
(52) U.S. Cl. ...................... 717/8; 717/4; 717/5; 717/7; 717/9; 717/136; 717/162; 717/124; 717/140; 706/206; 709/196
(58) Field of Search .............................. 717/5, 8, 9, 7, 717/4, 151, 136, 162, 124; 707/206; 711/170; 709/196

(56) References Cited

U.S. PATENT DOCUMENTS

| | | | | |
|---|---|---|---|---|
| 5,560,003 A | * | 9/1996 | Nilsen et al. | 707/206 |
| 5,561,786 A | * | 10/1996 | Morse | 711/170 |
| 5,590,332 A | * | 12/1996 | Baker | 717/5 |
| 5,848,423 A | * | 12/1998 | Ebrahim et al. | 707/206 |
| 5,900,001 A | * | 5/1999 | Wolczko et al. | 707/206 |
| 5,903,899 A | * | 5/1999 | Steele, Jr. | 707/206 |
| 5,903,900 A | * | 5/1999 | Knippel et al. | 707/206 |
| 6,047,125 A | * | 4/2000 | Agesen et al. | 717/9 |
| 6,081,665 A | * | 6/2000 | Nilsen et al. | 717/5 |
| 6,098,089 A | * | 8/2000 | O'Connor et al. | 709/104 |

(List continued on next page.)

OTHER PUBLICATIONS

Is It a Tee, a DAG or a Cyclic Graph? A Shape Analysis for Heap Directed Pointer in C, ACM, 1996, Ghiya et al.*
Aiken, et al., "Better Static Memory Management: Improving Region–Based Analysis of Higher–Order Languages", Proceedings of ACM SIGPLAN Conference on Programming Language Design and Implementation, San Diego, CA, Jun. 1995.

(List continued on next page.)

Primary Examiner—Kakali Chaki
Assistant Examiner—Chameli C. Das
(74) Attorney, Agent, or Firm—McGuireWoods LLP; Douglas W. Cameron, Esq.

(57) ABSTRACT

Information is computed about the reachability relationships among objects and pointers to enable transformation of a computer program for optimizing the creation and destruction of objects, while strictly performing the semantics of the original program. An interprocedural analysis is used to determine whether an object that is allocated on the heap during the execution of a procedure is not reachable from any global variable, parameter, or the return value of the procedure after it returns. If so, that object can be allocated on the stack frame of the procedure in which it is otherwise heap-allocated. This simplifies the memory allocation and deallocation operations, as allocation on the stack can be done more efficiently than allocation on the heap, and objects allocated on the stack frame of a procedure are automatically deallocated when the procedure returns, without incurring the overhead of garbage collection. This, in turn, leads to faster programs which use fewer computer processor resources to execute. The interprocedural analysis of the program summarizes the effect of a procedure call succinctly for different calling contexts of the procedure using a single summary representation. The method handles exceptions in the programming language, while taking advantage of the information about the visibility of variables in the exception handler. Variants of the method show how one or several of the features of the method may be performed.

13 Claims, 2 Drawing Sheets

U.S. PATENT DOCUMENTS

| | | | | |
|---|---|---|---|---|
| 6,115,782 | A | * | 9/2000 | Wolczko et al. ............. 711/100 |
| 6,192,517 | B1 | * | 2/2001 | Agesen et al. .................. 717/9 |
| 6,199,075 | B1 | * | 3/2001 | Ungar et al. ................. 707/206 |
| 6,226,653 | B1 | * | 5/2001 | Alpern et al. ............... 707/206 |
| 6,249,793 | B1 | * | 6/2001 | Printezis et al. ............ 707/206 |
| 6,134,558 | A1 | * | 11/2001 | Angel et al. .................... 717/4 |

OTHER PUBLICATIONS

B. Blanchet, "Escape Analysis: Correctness, Proof, Implementation and Experimental Results", Proceedings of $25^{th}$ ACM Symposium on Principles of Programming Languages, Jan. 1998.

C. Ruggieri, et al., "Lifetime Analysis of Dynamically Allocated Objects", Proceedings of $15^{th}$ ACM Symposium on Principles of Programming Languages, Jan. 1998.

D. Gay, et al., "Stack Allocating Objects in Java. Research Report", Microsoft Research 1999.

D. Gay et al., "Memory Management with Explicit Regions", Proceedings of ACM SIGPLAN Conference on Programming Language Design and Implementation, Montreal, Canada, Jun. 1998.

J. Hannan, "A Type–Based Analysis for Stack Allocation in Functional Languages", Proceedings of $2^{nd}$ International Static Analysis Symposium, Sep. 1995.

Y.G. Park et al., "Escape Analysis on Lists", Proceedings of ACM SIGPLAN Conference on Programming Language Design and Implementation, Jul. 1992.

L. Birkedal, et al., "From Region Inference to von Neumann Machines via Region Representation Inference", Proceedings of $23^{rd}$ ACM Symposium on Principles of Programming Languages, St. Petersburg, Florida, Jan. 1996.

A. Deutsch, "On the Complexity of Escape Analysis", Proceedings of $24^{th}$ ACM Symposium on Principles of Programming Languages, San Diego, Jan. 1997.

J. Hicks, "Experiences with Compiler–Directed Storage Reclamation", AMC–FPCA '83–6/93/Copenhagen, DK 1993.

* cited by examiner

METHOD FOR OPTIMIZING CREATION AND DESTRUCTION OF OBJECTS IN COMPUTER PROGRAMS

BACKGROUND OF THE INVENTION

1. Field of the Invention

The present invention generally relates to computer programming and, more particularly, to a method and variant of the method for a compiler (either static or dynamic), programming development environment or tool, or programmer to enable transformation of a program or part of a program so as to reduce the overhead of allocating and deallocating objects, while strictly preserving the exact semantics of the program or parts of the program that existed before the transformation.

2. Background Description

Programming languages, for example, the Java™, C and C++ programming languages support heap allocation for data that is dynamically created at arbitrary points during program execution (see D. Gay and Aiken, "Memory Management with Explicit Regions, *Proceedings of ACM SIGPLAN Conference on Programming Language Design and Implementation*, Montreal, Canada, June 1998). Variables representing data allocated in a program shall be referred to as objects, and variables that point to the objects will be referred to as pointers. In some languages like the C and C++ programming languages, the programmer is also given explicit control over deallocation of objects, using a free statement. However, the programmer has to be careful so as not to deallocate objects to which there is a pointer from any other variable referenced after the deallocation point. Otherwise the dangling pointer to an object that has already been deallocated can lead to an error during program execution. In order to free the programmers from the burden of determining when it is safe to deallocate objects, some languages like Java™ support garbage collection, where the run-time system assumes responsibility for determining when the storage for an object can safely be reclaimed. (Java is a trademark of Sun Microsystems, Inc.)

Every algorithm for garbage collection leads to some overhead being incurred at run-time while identifying the objects whose storage can be reclaimed. A compiler can bypass garbage collection of objects with known lifetimes. In particular, if the lifetime of an object is bounded by the lifetime of the stack frame associated with a procedure, the object can be allocated on the stack rather than the heap. The storage associated with the stack is automatically reclaimed when the procedure returns.

There are two different ways of allocating storage on the stack—dynamic allocation or static allocation. Dynamic stack allocation can be done by dynamically extending the size of the stack during execution. A well-known mechanism for such dynamic extension of the stack is via a system call named alloca on UNIX®-based systems. Static allocation of an object on the stack involves using a fixed location within the stack frame for that object. In order to use static allocation for an object determined to be stack-allocatable, the compiler has to further know the size of the object and check for one of the following two conditions: (i) either the original heap allocation does not take place inside a loop in the given procedure, or (ii) instances of the object allocated in different loop iterations should have non-overlapping lifetimes. (UNIX is a registered trademark of SCO.)

An alternate approach to stack allocation is to use a region in the heap for allocating objects whose lifetimes are bounded by the lifetime of the stack frame, and deallocating the entire region when the corresponding procedure returns. For simplicity of presentation, due to the conceptual similarity of these approaches, such a region-based approach shall be regarded as equivalent to performing stack allocation of data.

Many compilers use a representation called a call graph to analyze an entire program. A call graph has nodes representing procedures, and edges representing procedure calls. The term procedure is used to refer to subroutines, functions, and also methods in object-oriented languages. A direct procedure call, where the callee (called procedure) is known at the call site, is represented by a single edge in the call graph from the caller to the callee. A procedure call, where the callee is not known, such as a virtual method call in an object-oriented language or an indirect call through a pointer, is represented by edges from the caller to each possible callee. It is also possible that given a particular (callee) procedure, all callers of it may not be known. In that case, the call graph would conservatively put edges from all possible callers to that callee.

Within a procedure, many compilers use a representation called the control flow graph (CFG). Each node in a CFG represents a basic block and the edges represent the flow of control among the basic blocks. A basic block is a straight-line sequence of code that has a single entry (at the beginning) and a single exit (at the end). A statement with a procedure call does not disrupt a straight-line sequence of code. In the context of languages that support exceptions, such as the Java™ programming language, the definition of a basic block is relaxed to include statements which may throw an exception. In those cases, there is an implicit possible control flow from a statement throwing an exception to the block of code handling the exception. The basic block is not forced to end at each such statement, and instead, such a basic block bb is referred to as having a flag bb.outEdgeInMiddle set to true.

A topological sort order enumeration of nodes in a graph refers to an enumeration in which, if the graph contains an edge from node x to node y, then x appears before y. If a graph has cycles, then such an enumeration is not guaranteed for nodes involved in a cycle. A reverse topological sort order lists nodes in the reverse order of a topological sort.

Prior art for a similar goal of reducing the overhead of heap allocation and deallocation can be found in the following papers: A. Aiken, M. Fahndrich, and R. Levien, "Better Static Memory Management: Improving Region-Based Analysis of Higher-Order Languages", *Proceedings of ACM SIGPLAN Conference on Programming Language Design and Implementation*, San Diego, Calif., June 1995; L. Birkedal, M. Tofte, and M. Vejlstrup, "From Region Inference to von Neumann Machines via Region Representation Inference", *Proceedings of 23rd ACM Symposium on Principles of Programming Languages*, St. Petersburg, Fla., January 1996; B. Blanchet, "Escape Analysis: Correctness, Proof, Implementation and Experimental Results", *Proceedings of 25th ACM Symposium on Principles of Programming Languages*, January 1998; A. Deutsch, "On the Complexity of Escape Analysis", *Proceedings of 24th ACM Symposium on Principles of Programming Languages*, San Diego, January 1997; D. Gay and A. Aiken, "Memory Management with Explicit Regions", *Proceedings of ACM SIGPLAN Conference on Programming Language Design and Implementation*, Montreal, Canada, June 1998; J. Hannan, "A Type-Based Analysis for Stack Allocation in Functional Languages", *Proceedings of 2nd International Static Analysis Symposium*, September 1995; Y. G. Park and B. Goldberg, "Escape Analysis on Lists", *Proceedings of ACM*

SIGPLAN Conference on Programming Language Design and Implementation, July 1992; and C. Ruggieri and T. P. Murtagh, "Lifetime Analysis of Dynamically Allocated Objects" Proceedings of 15th ACM Symposium on Principles of Programming Languages, January 1988. Those methods do not handle programs with explicit constructs for multithreading and exceptions (e.g., the try-catch constructs in the Java™ programming language).

Prior art for replacing dynamic heap allocation of objects by stack allocation can be found in the paper by C. Ruggierie and T. P. Murtagh, supra. The analysis presented by C. Ruggierie and T. P. Murtagh is quite conservative. In particular, this method makes pessimistic assumptions about aliasing between different function parameters and variables accessed through the parameters.

Prior art for replacing dynamic heap allocation of objects by stack allocation for functional languages is presented in the papers by J. Hannan and Y. G. Park and B. Goldberg, supra. The methods described in these papers are restrictive, as they do not handle imperative languages like the Java™, C and C++ programming languages.

Prior art for replacing dynamic heap allocation of objects by stack allocation for list-like objects in functional languages is presented in the papers A. Deutsch and B. Blanchet, supra. These methods do not handle programs with explicit constructs for multithreading and exceptions.

Prior art for replacing dynamic heap allocation of objects by stack allocation for the Java™ programming language is found in the paper by D. Gay and B. Steensgaard, "Stack Allocating Objects in Java, Research Report", Microsoft Research, 1999. The method described by D. Gay and B. Steensgaard simply marks an object as not stack-allocatable if a reference to the object is ever stored in a field of another object. Therefore, this method fails to detect many objects, which can safely be allocated on the stack, as stack-allocatable.

SUMMARY OF THE INVENTION

The present invention is a method for a compiler, programming development environment or tool, or programmer to enable transformation of a program or parts of a program written in some machine language so as to reduce the overhead of allocating objects on the heap, or deallocating objects from the heap, or both.

More particularly, the present invention provides a method to analyze a computer program so that the information can be used to reduce the overhead of allocation and deallocation of objects in the program. The invention identifies those objects allocated on the heap that can instead be allocated on the stack frame of a procedure, without changing the semantics of the original program. The storage for these objects is automatically reclaimed when the procedure, on whose stack frame the objects were allocated, returns.

The preferred method of the present invention performs an interprocedural analysis of the program. For each procedure analyzed by the compiler, reachability relationships are identified among the different objects, fields of objects, and pointers referenced in the procedure. For each object allocated in the procedure, if at the end of the procedure, it is not reachable from any global variable, parameter of the procedure, or the return value of the procedure, the object is identified as stack-allocatable. A later pass of the compiler can use stack allocation for a stack-allocatable object in place of heap allocation.

The preferred method computes a succinct summary of the effect of a procedure call on the reachability relationships among objects visible to the caller of that procedure. The method is able to summarize this effect for different calling contexts of the procedure (i.e., for different aliasing relationships between parameters and objects reachable from parameters that hold at different call sites for that procedure) using a single summary representation. During the interprocedural analysis of the program, in a bottom-up traversal over the call graph of the program, the summary reachability information computed for a callee procedure is used to update the reachability information for actual parameters, return value, and variables reachable from those parameters and return value at the call site within the caller procedure. If there are cycles in the call graph (due to the use of recursion in the program), the analysis is performed in an iterative manner until a fixed point solution is obtained.

The method of the present invention can deal with language features like destructive updates of variables, multithreading, exceptions, and finalizer methods, which can complicate the compiler analysis. In particular, the preferred method of this invention correctly handles exceptions in the program, while taking advantage of the information about the visibility of variables in the exception handler.

An alternative embodiment of the method deals with cycles in the call graph (arising from the use of recursion) conservatively. It imposes an upper limit on the number of times each procedure is analyzed, rather than iteratively analyzing procedures involved in the cycle until the computed solution converges.

Another alternative embodiment of the method takes advantage of the type information of variables, when analyzing programs written in a type-safe language, such as the Java™ programming language. The type information is used to obtain less conservative information about the reachability effects on variables of a procedure that is not analyzed by the compiler due to various reasons, such as the code for the procedure being unavailable or to make the analysis faster.

Another alternative embodiment of the method uses a less precise representation to distinguish between different fields of an object, to reduce the storage requirements of the method and to make it faster, at the expense of some precision in the computed result.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The method described in this invention differ from the prior art in that the methods of the prior art do not perform the optimization based on an efficient computation of reachability relationships between objects.

The goal of the preferred method of the present invention, and its variants, is to analyze a program so that the information obtained by that analysis can be used to transform the program, thereby using stack allocation instead of heap allocation of objects. The ability to perform these transformations is important for the following reasons:

1. Allocation of data on the heap is more expensive than allocation on the stack. In multithreaded environments, heap allocation sometimes requires a locking operation to ensure access to the heap in mutual exclusion. No such locking operation is needed for stack allocation.
2. The run-time overhead of garbage collection can be significant, and is avoided for stack-allocated data, whose storage is automatically reclaimed when the procedure returns. For languages that allow explicit memory deallocation operations, the automatic reclamation of data has advantages of avoiding programmer bugs in determining when it is safe to deallocate data.
3. Allocating data on the stack can often improve the data locality and hence improve the performance of the program due to more efficient memory accesses to that data.

Thus, the transformations enabled by this invention are important to decrease the execution of the program being transformed, and to increase the performance of other programs executing on the system.

Determining Stack-Allocability of Objects in Programs

Figure 1:
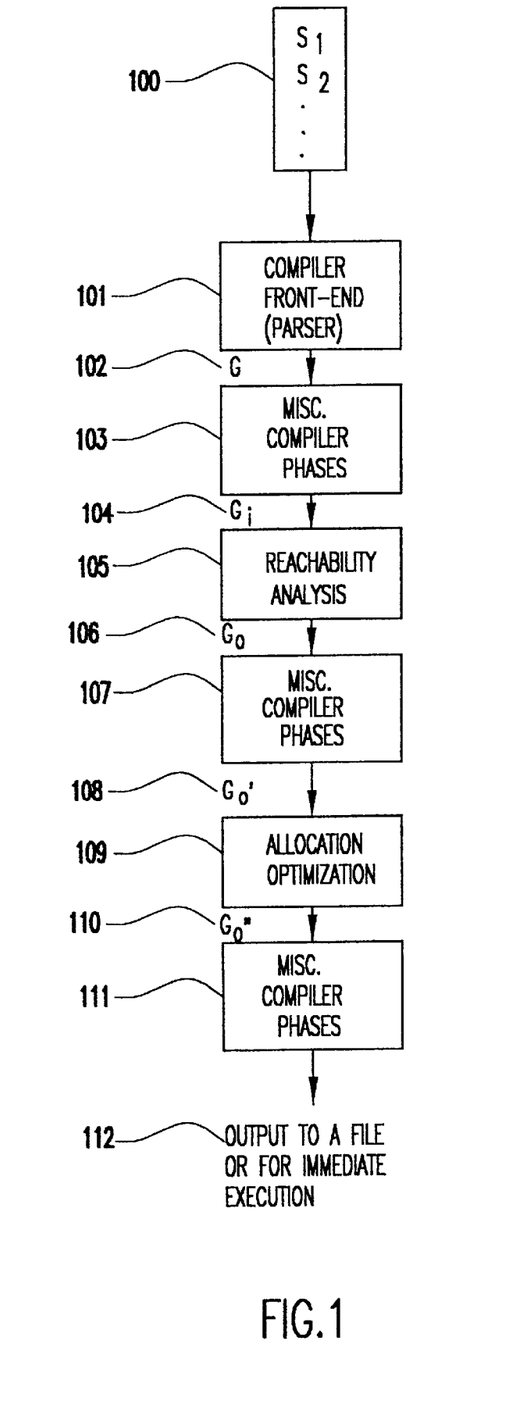
FIG. 1 is a block diagram of a compiler or compilation system that uses the method of this invention.

Referring now to the drawings, and more particularly to FIG. 1, there is shown an embodiment of the invention. A computer program 100 has been transformed into a list of instructions 102 by the front end or parser 101. The list of instructions can be represented by a graph (G) whose nodes are operations on variables, and whose edges represent the flow of control between instructions. It is not necessary that they be encoded as such, and may be encoded as records in a file, as a logically flat structure, or by other means. The instructions are the instruction set of an intermediate compiler language or machine. The labels of the graph contain auxiliary information about the edges and nodes in the graph. Some of the instructions at nodes on the graph are heap allocation operations, referred to as $O_A$. The subscript may be augmented with the number or symbol to further distinguish among different operations, as in, e.g., $O_{A,I}$ or $O_j$. In languages that support explicit deallocation operations, deallocation operations are treated under the category of heap allocation operations as well. Several other types of operations are of interest. The second are the references to variables in the program. The $r^{th}$ static reference to the variable V is referred to as $V_r$. References may be either reads or writes. Another type of operation of interest is a procedure invocation.

The list of instructions G 102 is optionally consumed by compiler, programming tool, or programming development operations 103 that may precede the Reachability Analysis and Allocation Optimization phases. These optional phases may or may not transform the instruction stream encoded in G. The output of these phases is referred to as $G_i$ 104, and is consumed by the Reachability Analysis 105. The Reachability Analysis phase transforms the program representation into $G_O$ 106 by marking some heap allocation operations as replaceable by stack allocation operations. The Reachability Analysis phase is discussed in more detail below, and in pseudocode lines 301 to 1413, below. The Allocation Optimization phase 109, that is preceded by the Reachability Analysis phase and possibly by some other optional compiler phases 107, performs the actual replacement of the marked heap allocations by stack allocations, and which transforms $G_{O'}$ 108, producing $G_{O''}$ 110. Allocation is discussed above in the Background Description section, and its implementation would be apparent to one skilled in the art. The information of value to future passes is contained in $G_{O''}$ 110, which is then passed to later compiler passes 111 and then output to a file or executed in 112, as shown in FIG. 1.

The Reachability Analysis Phase

For analyzing program code, a representation called a connection graph CG=(N, E), is used. A connection graph CG is a directed graph with nodes (forming the set N) representing variables, and edges (forming the set E) representing reachability connections between variables. There are two kinds of nodes: object nodes representing variables for data allocated in a program, and pointer nodes, representing variables that point to object variables. Each object may have zero or morefields. In some languages, like the Java™ programming language, fields of an object can only be pointer variables, whereas in some other languages, like the C++ programming language, a field of an object may either be a pointer or another object. A node corresponding to a field of an object variable is referred to also as afield node—it may fundamentally be a pointer node, or in languages that allow it, an object node. Given the connection graph of a procedure, we use the term phantom node to refer to a node corresponding to an object that is created outside the procedure and is reachable from a formal parameter. A node, during various stages of the analysis, may have one of the following three states: global_escape, arg_escape, or procedure_local. Each node, with three exceptions, is marked procedure_local when created initially. The first exception is for a phantom node, which is marked arg_escape. The second exception is for an object that may corresponds to a thread (and the fields of that object), for example, in the Java™ programming language, any object of a class that implements the Runnable interface. Such an object is marked global_escape upon creation, signifying that it escapes the procedure in which it is created (since the thread may be active even after the procedure in which it is created returns to its caller). The third exception is for an object on which a finalizer procedure that references the object may be executed before garbage collection (in the Java™ programming language, this is done for any object of a class that implements a non-trivial finalizer, i.e., overrides the finalize method of the standard Object class). Such an object node is marked global_escape upon creation. The terms "variables" and "nodes" shall be used interchangeably during the description of this invention, where it is clear that the node referred to in the connection graph represents the given variable.

The connection graph has three kinds of edges: points-to edges, deferred edges, and field edges. A points-to edge, denoted as $x^P \rightarrow y$, may be created from a pointer variable x to an object variable y. A deferred edge, $x^D \rightarrow y$, may be created from one pointer variable x to another pointer variable y. In programming languages that allow copying assignment from one object to another, such as the C++ programming language, a deferred edge may exist from one object node to another. Such a deferred edge from an object $O_1$ to an object $O_2$ is interpreted as a set of edges from each field in $O_1$, to the corresponding field in $O_2$. A field edge, $x^F \rightarrow y$, may be created from an object node x to a field node y.

A points-to path (PtPath(x,y)) in a connection graph is defined to be a sequence of edges $x \rightarrow x_1 \rightarrow x_2 \rightarrow \ldots \rightarrow y$, where x is a pointer node andy is an object node. The length of a points-to path, (Length(PtPath(x,y))), is the number of object nodes (including y) encountered along the path PtPath(x,y). The notation $x^{+1} \rightarrow y$ is used to denote a points-to path, PtPath(x,y), with length one.

Pseudocode is used in order to illustrate the method of the invention. The line number or step of the pseudocode is used in order to describe the method. The following pseudocode describes the process of reachability analysis on a program P. This method is also shown as a flow diagram in FIG. 2.

Figure 2:
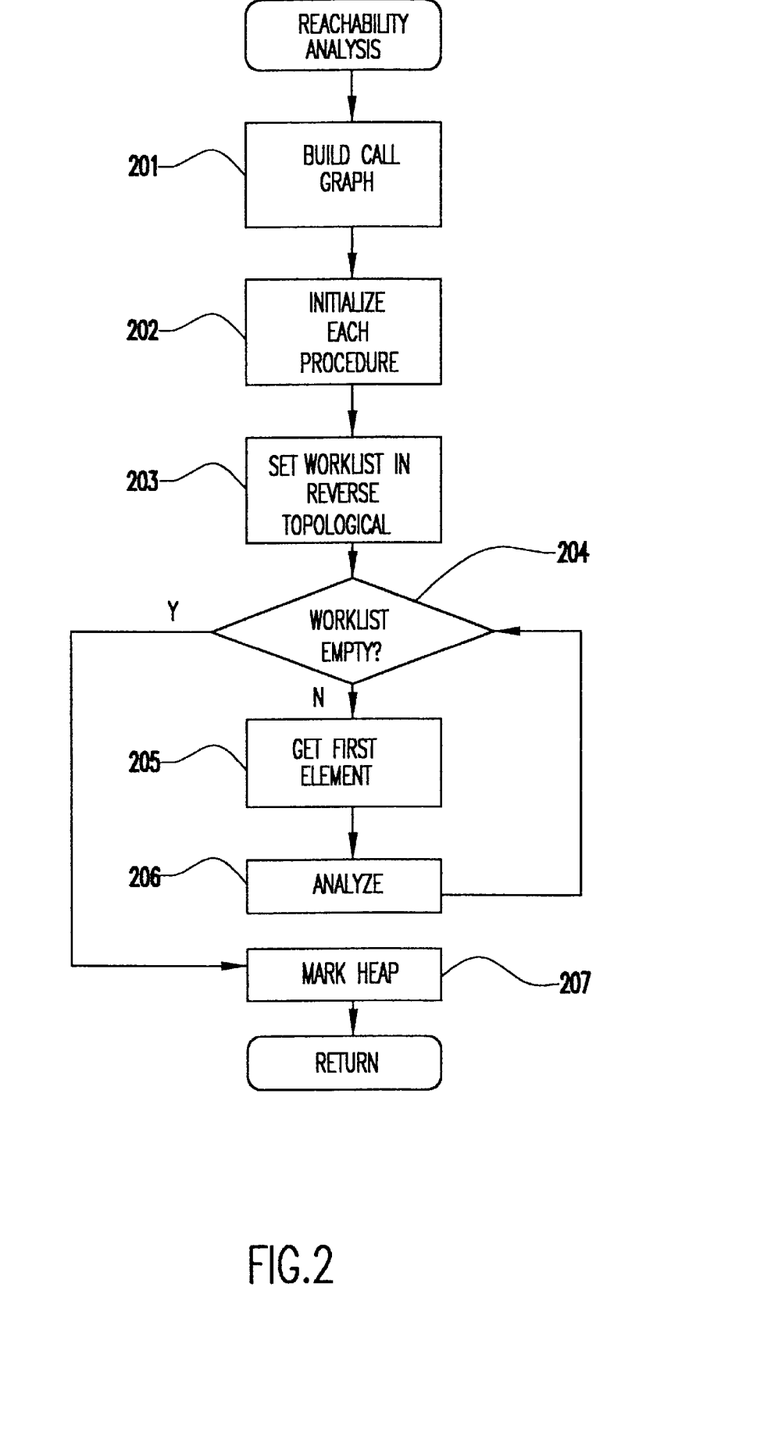
FIG. 2 is a block diagram showing the method of the invention.

```
301: ReachabilityAnalysis (G) {
302:    Build call-graph, CallG, of program represented by G;
303:    for each procedure n of program do
304:         n.NumNodes = O;
305:         n.NumPaths = O;
306:    end do
307:    Set Worklist = enumeration of nodes in CallG in reverse topo-
        logical sort order;
308:    while Worklist not empty {
309:         Get first element n and delete it from Worklist;
310:         Call AnalyzeProcedure(n, CallG, Worklist);
311:    }
312:    Mark all heap allocation sites whose created object is marked
        procedure_local as replaceable by stack-allocation;
313: }
```

Referring now to FIG. 2, the Reachability Analysis procedure, as shown in pseudocode above starting in line 301, takes as input a representation G of the program, and modifies G to record information about object variables which are not reachable from any object reference after the procedure in which they are allocated returns, and also generates information about the connections between pointers and objects in various procedures of the program in the form of a connection graph CG. A call graph of the program is built in function block 201. If a node in the call graph corresponds to a procedure which the system chooses not to analyze, it is marked no-analyze in the call graph. Examples of such procedures include native methods in the Java™ programming language, which the system may choose not to analyze further, or procedures from a different module (such as a dynamically linked library) whose changes are not supposed to change the behavior of the program being generated. An initialization for each procedure that will be used later to check for convergence of the analysis is performed in function block 202. The nodes in the call graph are added in a reverse-topological sort order to a work-list in function block 203. In the absence of cycles in the call graph, this ensures that a callee procedure appears in the work-list before any of its callers. A loop iterates over each procedure in the work-list until the work-list is empty. If there are more procedures on the work-list, as determined in decision block 204, then the procedure n at the head of the work-list is removed from the work-list function block 205. It is analyzed by AnalyzeProcedure in function block 206 to obtain a classification of each variable in the procedure into one of the following categories: global_escape, arg_escape and procedure_local.

AnalyzeProcedure, described further below, also puts each caller of procedure n back on the work-list if the classification of any variable changed during that invocation of AnalyzeProcedure. This ensures that the program is analyzed correctly in the presence of cycles in the call graph, which arise due to recursion. After the work-list becomes empty as determined in decision block 204, program variables have been classified into one of the following categories: global_escape, arg_escape and procedure_local. In function block 207, after all procedures have been analyzed, all heap allocation sites whose corresponding objects are marked procedure_local are marked as stack-allocatable. A later compiler pass Allocation Optimization, as shown in FIG. 1 at block 109, can replace those heap allocations with stack allocation.

The following pseudocode describes AnalyzeProcedure which obtains a classification of each variable in the procedure n into one of the following categories: global_escape, arg_escape and procedure_local.

```
401: AnalyzeProcedure(n, CallG, Worklist) {
402:    Build an initial connection graph, CG, for procedure n;
403:    if n is marked as no-analyze then // make pessimistic assumption
404:         foreach actual parameter and return node a_i do
405:              state(a_i) = global_escape;
406:         enddo
407:         return;
408:    endif
409:    Build control flow graph, CFG, of procedure n;
410:    Set BBWorkList = enumeration of nodes in CFG in topological
        sort order;
411:    while BBWorkList not empty {
412:              Get first element bb and delete it from BBWorkList;
413:              AnalyzeBB(n, CG, CFG, bb, BBWorkList);
414:    enddo
415:    if (Ischanged(n)) then
416:         for each caller c_i of procedure n do
417:              if c_i is not marked as no-analyze then
418:                   add c_i to Worklist;
419:              endif
420:         end do
421:    endif
422: }
```

An initial connection graph for the procedure is built in line 402. This connection graph has nodes for each pointer variable in the procedure, including those that are formal parameters of the procedure. For each ($i^{th}$) formal parameter $f_i$ and for the return value that is a pointer, there are two nodes in the connection graph, one referred to as $f_i$, and the other referred to as $a_i$, a placeholder for the corresponding actual parameter passed in or return value used at different call sites of the procedure. The connection graph initially created for the procedure has a deferred edge from each formal parameter node $f_i$ to the corresponding $a_i$. Line 403 first checks if this procedure is marked no-analyze. If so, in lines 403 through 406, each node $a_i$, which serves as the placeholder for an actual parameter or return value, is marked global_escape and no further processing is done. If the procedure is not marked no-analyze a control flow graph of the procedure is built in line 409. The nodes of the control flow graph, representing basic blocks in the procedure, are added in topological sort order to a work-list BBWorkList in line 410. Loop 411 iterates over each entry in BBWorkList until that work-list is empty. The basic block bb at the head of the work-list is removed from the work-list in line 412. It is analyzed by AnalyzeBB in line 413, described further at lines 501 to 517. In line 415, the call to IsChanged, described further below at lines 1401 to 1413, determines if the classification of any variable changed during this invocation of AnalyzeProcedure. If there was a change, each caller of the procedure n is added to the work-list Worklist consisting of the procedures which need to be analyzed further.

The pseudocode below describes AnalyzeBB which is called in line 413 above, and is used to analyze a given basic block bb.

```
501: AnalyzeBB(n, CG, CFG, bb, BBWorkList) {
502:    for each predecessor basic block p of bb in CFG do
503:         for each pointer variable v do
504:              merge connections for variable v in the representation for
                  p;
```

```
505:        if merge leads to any new connection for v in bb then
506:            add successors of bb in CFG to BBWorkList;
507:        end if
508:    end do
509: enddo
510: for each statement S of basic block bb in forward order do
511:    switch (statement type)
512:        case assignment: AnalyzeAssign(CG, S,
                bb.outEdgeInMiddle);
513:        case procedure call: AnalyzeProcCall(n, CG, S);
514:        case return or exit: Summarize(n, CG);
515:    endswitch
516: enddo
517: }
```

Loop 502 iterates over each basic block p which is a predecessor of bb in the control flow graph. Loop 503 iterates over each connection graph node representing a pointer variable. In line 504, the connections for each pointer variable node are merged with the connections for that pointer variable, as they exist in basic block p. If this merging of connections leads to any new edges being introduced for variable v in bb, the successors of bb in the control flow graph are added, in line 506, to BBWorkList to ensure that those basic blocks are analyzed again. Loop 510 iterates over each statement in its order of appearance in the basic block bb. Based on the check for the type of statement in line 511, the appropriate analysis is done. If the statement is an assignment statement, it is handled by AnalyzeAssign in line 512, described further below. If the given basic block bb appears in an exception block in the current procedure, such as a try block as part of the try-catch construct in the Java™ programming language, the last parameter to AnalyzeAssign (bb.outEdgeInMiddle) is true. This parameter ensures that AnalyzeAssign takes into account the possible control flow out of the basic block due to an exception thrown in that basic block. If the statement consists of a procedure call, it is handled by AnalyzeProcCall in line 513, described further below. If the statement represents the end of the procedure or a return from it, the connection graph for the procedure is summarized by Summarize as shown in line 514 and described further below.

The pseudocode below describes AnalyzeAssign which is called in line 512 above.

```
601: AnalyzeAssign (CG, S, noKill) {
602:    switch (statement type)
603:        case [a_1.a_2...a_n = (address of) O;]
604:            AnalyzeAssignCase1 (CG S, noKill)
605:        case [a_1.a_2...a_n = b_1.b_2...b_m]
606:            AnalyzeAssignCase2 (CG, S, noKill)
607:    endswitch
608: }
```

Lines 602 through 607 check for two types of assignment statements, which are illustrated as case $[a_1,a_2, \ldots, a_n=(\text{address of}) \, O]$ and as case $[a_1,a_2, \ldots, a_n=b_1, b_2, \ldots, b_m]$. For the first case, the procedure AnalyzeAssignCase1 is called in Line 604, and for the second case, the procedure AnalyzeAssignCase2 is called in line 606. Those skilled in the art would recognize that this allows the method to handle statements that destructively update variables in an imperative language.

The pseudocode below describes AnalyzeAssignCase1 which analyzes statements of the form $a_1,a_2, \ldots, a_n=$ (address of) O. This represents all assignment statements where a pointer gets the value of the address of an object which may be allocated dynamically or statically. The actual notation for this kind of statement varies in different languages. For instance, in the Java™ programming language, the statement may appear as $a_{,1},a_2, \ldots, a_n=\text{new}$ Constructor( . . . ).

```
701: AnalyzeAssignCase1(CG, S, noKill)
702:    // S is: a1,a2,...,an = (address of) O;
703:    Create a new object On (if one does not exist for this site);
704:    if (a, is a formal parameter and no phantom node for a, exists) then
705:        Create phantom nodes O_2,O_3,...,O_{n-1} such that a_2 is a field in
            O_2, a_3 is a field in O_3, and so on; Insert points-to edge from
            a_1 to O_2, from a_2 to O_3, and so on.
706:    endif
707:    if (n = 1) then
708:        Let R be the set of incoming deferred edges into a_1;
709:        Let S be the set of outgoing points-to edges from a_1;
710:        Let T be the set of outgoing deferred edges from a_1;
711:        if (not noKill) then
712:            Add new points-to edges from the source node of
                edges in R to target nodes of edges in S;
713:            Add new deferred edges from the source node of
                edges in R to target nodes of edges in T;
714:            Delete all edges in the sets R, S, and T from CG;
715:        endif
716:        Add a points-to edge from a_1 to O_n;
717:    else
718:        Find all the field nodes a_n starting from node a_1 corresponding
            to the path a_1,a_2,...,a_n; Let A be the set of all a_n nodes;
719:        if (for any a_i node, 1 ≤ i ≤ n, state(a_i) = global_escape) then
720:            MakeBottom(O_n);
721:        else
722:            Add a points-to edge from each node in A to O_n;
723:        endif
724:    endif
725: }
```

Line 703 first creates a new object node $O_n$ (if one does not already exist for this site). Next, line 705 creates phantom nodes and edges in case a, is a parameter (if the phantom nodes have not yet been created). These phantom nodes and edges are needed for interprocedural analysis to collect procedural summary information. At line 707, if n is 1 the general case can be simplified (specialized) to $a_1=$ (address of) O. This simplified case is handled in lines 708 through 716. First, line 711 checks if it is safe to kill the information about the previous connections of $a_1$, (whether or not to kill was originally determined for the entire basic block in line 512 above). Effectively, this check ensures that if the given statement S appears inside an exception block within the current procedure, such as inside a try block in the Java™ programming language, the previous connections of $a_1$ are not killed, so that the analysis remains valid in case an exception is thrown and the control is transferred to the exception handling code (such as a catch block in the Java™ programming language) within the procedure. This method allows previous connections of $a_1$ to be killed if the statement S does not appear in an exception block in the current procedure, even if dynamically, it appears inside an exception block of a calling procedure. Since the new value of $a_1$ would not be visible at any exception handling code outside the current procedure, it is safe to kill the previous connections of $a_1$ within the procedure in this case. If it is safe to kill the previous data flow information, lines 712 and 713 bypass $a_1$ by connecting the predecessor nodes of $a_1$ with the successor nodes of $a_1$, and 714 deletes the previous incoming edges into $a_1$ and the previous outgoing edges from $a_1$. These steps 712 through 714 may actually be implemented using a new node for $a_1$ and using this new node for a, instead of the previous node for $a_1$ from this point onwards.

A points-to edge is added from the node for $a_1$ to $O_n$ in 716. The more general case of the assignment statement, where n is larger than 1 is handled in Lines 718 through 723. No deletion of edges is done in this case. Line 718 identifies all the field nodes in the connection graph at path length n from $a_1$ corresponding to the path $a_1, a_2, \ldots, a_n$. Let all of these field nodes form the set A. If during the traversal of nodes during the previous step in line 718, any node with state global_escape was encountered, the object $O_n$ (and any node reachable from it) is also marked global_escape by invoking MakeBottom on $O_n$. Finally, in line 722, a points-to edge is added from each node in the set A (computed in line 718) to $O_n$.

The following pseudocode describes AnalyzeAssignCase2 which analyzes statements of the form $a_1, a_2, \ldots, a_n = b_1, b_2, \ldots b_m$.

```
801: AnalyzeAssignCase2 (CG, S, noKill) {
802:    // S is: a₁,a₂,...,aₙ = b₁,b₂,...,bₘ;
803:    if (a₁ is a formal parameter and no phantom node for a₁ exists)
        then
804:        Create phantom nodes O₂,O₃,...,Oₙ₋₁ such that a₂ is a field in
            O₂, a₃ is a field in O₃ and so on; Insert points-to edge
            from a₁ to O₂, from a₂ to O₃, and so on.
805:    end if
806:    if (b₁ is a formal parameter and no phantom node for b₁ exists)
        then
807:        Create phantom nodes Q₂, Q₃,...,Qₘ₋₁ such that b₂ is a
            field in Q₂, b₃ is a field in Q₃, and so on; Insert
            points-to edge from b₁ to Q₂, from b₂ to Q₃, and so on.
808:    end if
809:    Find all the field nodes bₘ starting from node b, corresponding
        to the path b₁,b₂,...,bₘ; Let B be the set of all bₘ nodes.
810:    if(n = 1) then
811:        Let R be the set of incoming deferred edges into a₁;
812:        Let S be the set of outgoing points-to edges from a₁;
813:        Let T be the set of outgoing deferred edges from a₁;
814:        if (a₁ is a pointer and not noKill) then
815:            Add new points-to edges from the source node of edges
                in R to target nodes of edges in S;
816:            Add new deferred edges from the source node of edges
                in R to target nodes of edges in T;
817:            Delete all edges in the sets R, S, and T from CG;
818:        endif
819:        Add a deferred edge from a₁ to each node in B;
820:    else
821:        Find all the field nodes aₙ starting from node a₁
            corresponding to the path a₁,a₂,...,aₙ; Let A be
            the set of aₙ nodes.
822:        if (for any aᵢ node, 1 ≤ i ≤ n, state(a₁) = global escape) then
823:            for each node b in B do
824:                MakeBottom(b);
825:            end do
826:        else
827:            Add a deferred edge from each node in A to each node
                in B;
828:        end if
829:    end if
830: }
```

As described above for AnalyzeAssignCase1, phantom nodes and edges are created whenever $a_1$ or $b_1$ is a formal parameter. This is done in lines 803 through 808. Then line 809 identifies all the field nodes in the connection graph at path length m from $b_1$, corresponding to the path $b_1, b_2, \ldots, b_m$. Let all of these field nodes form the set B. When n is 1, the special case $a_1 = b_1, b_2, \ldots, b_m$ is handled in lines 811 through 819. If $a_1$ is a pointer and if it is safe to kill the previous connections of pointer variables in the given statement (determined, as above, for the entire basic block in line 512), lines 815 and 816 bypass $a_1$ by connecting the predecessor nodes of $a_1$ with the successor nodes of $a_1$ and line 817 deletes the previous incoming edges into $a_1$ and the previous outgoing edges from $a_1$. These steps 815 through 817 may actually be implemented, as for the previous case, using a new node for $a_1$, and using this new node for $a_1$ instead of the previous node for $a_1$ from this point onwards. A points-to edge is added from the node for $a_1$ to each node in B in line 819. The more general case of the assignment statement, where n is larger than 1 is handled in lines 821 through 829. No deletion of edges is done in this case. Line 821 identifies all the field nodes in the connection graph at path length n from $a_1$ corresponding to the path $a_1, a_2, \ldots, a_n$. Let all of these field nodes form the set A. If during the traversal of nodes during the previous step in line 821, any node with state global_escape was encountered, all nodes b in the set B (iterated over in Loop 823) are marked global_escape by calling MakeBottom in line 824, which also marks each node reachable from b as global_escape. Finally, in line 827, a deferred edge is added from each node in the set A (computed in 821) to each node in the set B (computed in line 809).

The following pseudocode describes AnalyzeProcCall which is called at line 513, above.

```
901: AnalyzeProcCall(S){
902:    Let < aᵢ, âᵢ >, 0 ≤ i ≤ n - 1 be the actual parameter pairs at S.
903:    Let < aₙ, âₙ > be the return node pair at S.
904:    foreach target method mᵢ at S do
905:        // Multiple candidate target methods might exist due to virtual
            call.
906:        foreach object node n_O of the callee reachable from aᵢ of the
            callee do
907:            visited (n_O) = false;
908:        end do
909:        foreach < aᵢ, âᵢ > pair do
910:            // For each object node n_O reachable from aᵢ of the callee,
                compute
911:            // its equivalent object nodes, EquivObj(n_O, S), of the caller.
912:            // In doing so, create phantom nodes if necessary.
913:            ComputeEquivNodes (aᵢ, {âᵢ}, S);
914:        end do
915:        foreach aᵢ, 0 ≤ i ≤ n do
916:            // For each object node oᵢ reachable from aᵢ of the callee,
917:            // if oᵢᶠ→ fⱼᴾ→ o_k, make sure
918:            // (1) oᵢᴾ→fⱼᴾ→ô_k, for all oⱼ's
919:            // equivalent nodes ôᵢ, and for all o_k's equivalent nodes ô_k;
920:            // (2) any deferred edge from fⱼ to another field node or aᵢ
                will have
921:            // its corresponding edge between equivalent nodes at the
                caller
922:            InsertEdges(aᵢ, S);
923:        end do
924:    end do
925: }
```

As explained earlier, a call site can have multiple target methods statically associated with it, which the loop 904 handles by applying the body of the loop to each target method at the call site. For each target method, line 907 first logically marks all the object nodes reachable from the actual parameter nodes of the method as not visited. This step is not physically needed due to the version-number scheme employed. Then, for each pair of actual node of the method and the corresponding actual node at the call site, line 913 (described further at line 1001, below) computes the equivalent nodes of object and field nodes of the called method, creating phantom nodes at the caller method. Using the equivalent node information, line 922 (described in detail at line 1101) inserts edges, if not already existent, between nodes of the caller method if their equivalent nodes of the callee method have edges between them.

The pseudocode below describes ComputeEquivNodes which is called in line 913 to compute the equivalent nodes of object and field nodes of the called method.

```
1001: ComputeEquivNodes(f_ee: node; EquivF: set of nodes, S: call.site) {
1002:    // EquivF is the set of equivalent nodes of fee.
1003:    // Subscript "ee" stands for callee. and "er" stands for caller.
1004:    if (state(f_ee) = global_escape) then
1005:       foreach (f_er ∈ EquivF) do
1006:          MakeBottom(f_er);
1007:       end do
1008:       return;
1009:    endif
1010:    foreach object node n_o s.t.f_ee^P→ n_o do
1011:       if visited(n_o) = true then
1012:          continue; // skip the following with the current n_o
1013:       endif
1014:       visited (n_o) = true;
1015:       // n_o is pointed to by f_ee
1016:       foreach n^_o ∈ {n^_o | f_er^+1→ n^_o, f_er ∈ EquivF} do
1017:          // f_er is one of f_ee's equivalent nodes of the caller.
1018:          // n^_o is one of the nodes pointed to by f_er
1019:          // if no such n^_o exists, create one phantom node.
1020:          EqF = {}; // initialize EqF to empty set
1021:          if n^_o ∈ EquivObj(n_o, S) then
1022:             EquivObj(n_o, S) = EquivObj(n_o, S) ∪ {n^_o};
1023:             // add n^_o to EquivObj(n_o, S)
1024:          endif
1025:          foreach f^_ee s.t. n_o^F→ f^_ee do
1026:             EqF = { f^_er | n^_o^F→ f^_er fid(f^_ee) = fid(f^_er) };
1027:             // Matching field nodes of n^_o
1028:             // become equivalent field nodes of f_ee
1029:             ComputeEquivNodes(f^_ee, EqF, S); // invoke recursively
1030:          end do
1031:       end do
1032:    end do
1033: }
```

The first parameter, $f_{ee}$ is either an actual parameter node or a field node of an object node. Line 1004 checks if the callee node $f_{ee}$ is marked global_escape. In that case, each equivalent node of $f_{ee}$ is marked global_escape in lines 1005 through 1007, and the procedure returns in line 1008. Loop 1010 iterates over each node, $n_0$ in the connection graph that has a point-to edge from $f_{ee}$ skipping $n_0$ if it has already been visited (Lines 1011 and 1012) while computing equivalent nodes. If it has not been visited before, line 1014 marks it as visited for proper termination of the algorithm. Then, Loop 1016 iterates over each object node of the caller that has a point-to path of length one from any of the nodes in EquivF, which is the set of nodes of the caller equivalent to $f_{ee}$. These caller's object nodes are added to the set of equivalent nodes of the callee node $n_0$ in lines 1021 through 1024. Then, for each field node of $n_0$ iterated over in Loop 1025, line 1026 computes the matching field nodes, EqF of the caller's equivalent. The procedure then invokes itself recursively at line 1029, using the field node of $n_0$ and the equivalent caller nodes' matching field nodes, EqF as the new parameters.

The following pseudocode describes InsertEdges which is called in line 922, and is used to insert edges out of the equivalent node of $n_i$ in the caller to reflect the effect of the procedure call.

```
1101: InsertEdges(n_i: node, S: callsite) {
1102:    if (visited(n_i) = true) then
1103:       return;
1104:    endif
1105:    visited(n_i) = true;
```

-continued

```
1106:    if n_i is an object node then
1107:       foreach objectnode o_k s.t. n_i^F→ f_j^P→o_k do
1108:          // o_k is pointed to by f_j, which is a field node of n_i
1109:          foreach object node n^_i ∈ EquivObj(n_i, S) do
1110:             foreach object node o^_k ∈ EquivObj(o_k, S) do
1111:                insert a points-to edge, if not already existing, from
                     f^_j to o^_k, where n^_i^F→ f^_j
1112::           end do
1113:          end do
1114:          foreach object node o_i s.t. o_i^F→ f_m, and there exists a
                  deferred edge from f_j to f_m do
1115:             foreach object node n^_i ∈ EquivObj(n_j, S) do
1116:                foreach object node o^_i ∈ EquivObj(o_i, S) do
1117:                   insert a deferred edge, if not already existing, from
                        f^_j to f^_m, where n^_i^F→ f^_j and o^_i^F→ f^_m;
1118:                end do
1119:             end do
1120:          end do
1121:          foreach a_p to which there exists a deferred edge from f_j do
1122:             insert deferred edges from f^_j of all n_i's equivalent nodes
                  to the equivalent node a^_p of a_p in the caller;
1123:          end do
1124:          InsertEdges(ok, S); 11 recursively invoke.
1125:       end do
1126:    else
1127:       foreach edge from fl to k do
1128:          insert an edge of the same type from equivalent nodes, n;.,
             of fl to
             equivalent nodes, fl > of k in the caller;
1129:          if k not a field node then
1130:             InsertEdges(nk, S);
1131:          endif
1132:       end do
1133:    endif
1134: }
```

First, line 1102 checks, using a version-numbering scheme, if $n_i$ has already been visited. If so, the procedure returns in line 1103. The node $n_i$ is marked visited, using the version-numbering scheme, in 1105. Line 1106 checks if $n_i$ is an object node, and lines 1007 through 1125 handle that case. Loop 1107 identifies, for each field, $f_j$, of the object node, $n_i$, in the callee's connection graph, the set of object nodes, $o_k$ that have a points-to edge onto from $f_j$. Lines 1109 through 1113 insert edges, if not already existent, from the matching field nodes of the caller's object nodes equivalent to $n_i$, to caller's object nodes equivalent to $o_k$ (the equivalent nodes of $n_i$ are iterated over in Loop 1109 and the equivalent nodes of $o_k$ are iterated over in Loop 1110). Next, Loop 1114 iterates over each object node $o_k$, that owns a field $f_m$ to which there is a deferred edge from field $f_j$ of $n_i$. Lines 1115 through 1119 insert deferred edges, if not already existent, from the matching field nodes of the caller's object nodes equivalent to $n_i$, to the matching field nodes of the caller's object nodes equivalent to $o_1$ (the equivalent nodes of $n_i$ are iterated over in Loop 1115 and the equivalent nodes of $o_1$, are iterated over in Loop 1116). Next, Loop 1121 iterates over each actual parameter node or return node, $a_p$, to which there is a deferred edge from $f_j$. Line 1122 inserts deferred edges from the matching field nodes of the caller's object nodes equivalent to $n_i$, to the equivalent node(s) of the actual parameter or return node in the caller. Line 1124 invokes the procedure recursively for the object node $o_k$ in place of $n_i$, to ensure that edges out of $o_k$ or its fields are reflected in the caller. Lines 1127 through 1132 take care of the case where $n_i$ is not an object node (i.e., it may be an actual parameter or return node). Loop 1127 iterates over each outgoing edge from $n_j$. For each such node $n_k$, 1128 inserts edges from the equivalent nodes of $n_i$ to the equivalent nodes of $n_k$ in the caller's connection graph. Furthermore, if $n_k$ is an object node, line 1130 recursively invokes the procedure for $n_k$, to ensure that edges out of $n_k$ or its fields are reflected in the caller.

The following pseudocode describes MakeBottom, which is called above in lines 720, 824 and 1006.

```
1201: MakeBottom(v) {
1202:    if (state(v) ≠ global_escape) then
1203:        state(v) = global_escape;
1204:        foreach node x reachable from v do
1205:            if (state(x) ≠ global_escape) then
1206:                state(x) = global escape;
1207:            endif
1208:        end do
1209:    endif
1210: }
```

First, line 1202 checks if the node v is not currently marked global_escape. If the node is already marked global_escape, nothing further needs to be done. Otherwise, line 1203 marks the node as global_escape. Loop 1204 goes over each node in the connection graph that is reachable from v. For each such node, x, line 1205 checks if the node is not currently marked global_escape, and in that case, line 1006 marks it global_escape.

The following pseudocode describes Summarize, which is called in line 514, above.

```
1301: Summarize(n,CG) {
1302:    foreach formal parameter f f procedure n do
1303:        foreach node v in CG reachable from fi do
1304:            if (state(v) procedure local) then
1305:                state(v) = arg escape;
1306:            endif
1307:            if a PtPath v w exists, but the edge v w does not exist then
1308:                add edge w;
1309:            endif
1310:            remove all deferred edges out of v;
1311:        end do
1312:    end do
1313:}
```

Loop 1302 iterates over each formal parameter, $f_i$, of the given procedure n. Loop 1303 iterates over each node, v, in the connection graph that is reachable from $f_i$. If the node v is marked procedure_local, line 1305 marks it arg_escape. Furthermore, all deferred edges out of v are taken into account by creating a points to edge $v^P \rightarrow w$ (line 1308) that did not previously exist for every PtPath $v^{+1} \rightarrow w$. Thus, the effect of Summarize is to leave the nodes marked global_ escape as they are, but mark other nodes that are reachable from a parameter node as arg_escape, and factor in the information from all deferred edges along those paths.

This summary representation for the given procedure n is later used at call sites to this procedure from its callers, as described above in AnalyzeProcCall at line 901. One should also note that the same summary representation can be used regardless of the calling context at these different call sites, where calling context means, for example, aliasing relationships between variables reachable from parameters.

The following pseudocode describes IsChanged, which is called in line 415, above.

```
1401: Ischanged(n) {
1402:    RealNodes = { object_nodes, field_nodes, local_variable_nodes,
1403:        actual_nodes, return_node }
1404:    NumNodes = SizeOf(Real Nodes); // number of nodes in
            RealNodes set
1405:    NumPaths = number of length one point to paths among nodes in
            RealNodes;
1406:    if (NumNodes >= n.NumNodes) or (NumPaths >= n.NumPaths)
            then
1407:        n.NumNodes = NumNodes;
1408:        n.NumPaths = Numpaths;
1409:        return true;
1410:    else
1411:        return false;
1412:    endif
1413: }
```

The algorithm determines whether there is a change in the connection graph that needs further iterations. Changes in the connection graph that need further iterations are defined to be any of the following: (1) change in the number of real nodes: object nodes, field nodes, local variable nodes, parameter nodes, and the return node; or (2) change in the number of point-to paths of length one among the real nodes. If any change has occurred, the procedure returns true in line 1408, otherwise it returns false in line 1410.

The final transformed program resulting from the method of this invention can be fed into other phases of a compiler, programming environment or program development tool for further manipulation, or it can be stored into a file for later retrieval, analysis or processing.

Variants of Reachability Analysis

In addition to the preferred embodiment as described above, various modifications are now described. The following variants of the preferred embodiment of Reachability Analysis generally simplify this analysis phase and make it more efficient in speed and/or memory usage, but some variants may also lead to less precise results.

For example, in another possible embodiment, the compiler may not perform iterations over the procedures involved in a cycle in the call graph, as performed in loop 308 above, until the solution converges (i.e., until there is no change to the computed solution). Instead, the compiler may impose an upper limit on the number of times that a procedure is analyzed, and in the presence of cycles in the call graph, if the solution has not converged yet, may use conservative analysis, such as marking variables corresponding to actual parameters and return values as global_ escape.

Similarly, in another embodiment, the cycles in the control flow graph may be handled differently than in the preferred method, shown in Loop 411 above. Again, an upper limit may be imposed on the number of times that a basic block is analyzed, and if a converged solution is not obtained while adhering to that limit, a more conservative solution might be used instead.

In other embodiments, the compiler may choose not to build a complete call graph of the program, or equivalently, regard many procedures in the call graph as no-analyze. This may be done due to the code for the procedure being unavailable, or to make analysis faster, or to avoid problems with binary compatibility of the generated code. In an embodiment that represents one extreme of this variation, the compiler, may choose not to do any interprocedural analysis, and regard each procedure called inside the current procedure as no-analyze, and assume conservative information at the call site. As an example of another embodiment that represents a less extreme version of this variation, a run-time compiler, with more constraints on compilation time, may decide to do detailed analysis of only selected parts of the program where it is spending a fair amount of time during execution. Those procedures, in which the program does not spend much time, may be marked no-analyze and conservative information may be used (similar to the way the preferred method handles procedures marked no-analyze in line 403) at call sites to those procedures.

In yet another embodiment, a flow-insensitive version of the method described in AnalyzeProcedure (which those skilled in the art would recognize as aflow-sensitive method) may be used. In this embodiment, no killing of data flow information (represented by the bypassing and deletion of previous connection graph edges in Lines 712 through 714, above, and lines 815 through 817, above) is performed. Furthermore, there is no need to have different nodes in the connection graph for the same pointer variable in this embodiment. This variant simplifies the compiler analysis and makes the analysis more efficient.

In another embodiment, when a node is just marked global_escape, the method would not eagerly mark each node reachable from it as global_escape, as done in procedure MakeBottom, called on lines 720, 824 and 1006. Instead, the act of marking each node reachable from a global_escape node as global_escape would be deferred until the connection graph is summarized for the procedure. Those skilled in the art would recognize this as a lazy variant of this step in the preferred embodiment. On the other hand, in another embodiment, a node that is reachable from a formal parameter node of the procedure may be marked arg_escape eagerly, instead of being marked arg_escape lazily when the connection graph is summarized for the procedure, as in Line 1305.

In another embodiment, a different method may be used to determine whether the connection graph has changed. Instead of using the method shown in lines 1401 to 1413, each time a new edge is added or the state of a node is changed (for example, from procedure_local to global_escape), a flag may be set to indicate that the connection graph has changed.

In other embodiments, separate nodes may not be used for all different fields of an object variable. At one extreme, in an embodiment, each field of an object may be represented by the node for the object itself. In another embodiment representing a less extreme position, multiple fields of an object may be represented by a single node. The variations reduce the space requirements of the method and make it faster than the method in the preferred embodiment, but the analysis also becomes more conservative.

On the other hand, this variant of the preferred embodiment is used to make the analysis more precise. In this variant, type information is used to refine the connection graph information when compiling a language that is type-safe, such as the Java™ programming language. At a call-site to a procedure which is regarded as no-analyze, less conservative information is used than that shown in AnalyzeProcedure in lines 402 to 407. This embodiment would only allow connections to parameters and return value nodes that are allowed by the type system. A deferred edge is allowed only from a variable that points to type $T_1$ to another variable that points to type $T_2$ if the type system allows a variable of type $T_1$ to be assigned to another variable of type $T_2$. A points-to edge is allowed only from a variable that points to type $T_1$ to another variable of type $T_2$ if the type system allows a variable of type $T_1$ to be assigned to another variable of type $T_2$. A field edge is allowed from a variable of type $T_1$ to variable of type $T_2$ if under the type system, $T_1$ has a member of type $T_3$ and if a variable of type $T_3$ may be assigned to another variable of type $T_2$.

In another embodiment, the compiler may not actually use a connection graph data structure—it may use a different representation, for example, lists, to maintain information about connections between variables.

Thus, it should be understood that the preferred embodiment is provided as an example and not as a limitation.

While the invention has been described in terms of a preferred embodiment, with several variants, those skilled in the art will recognize that the invention can be practiced with modification within the spirit and scope of the appended claims.

Having thus described our invention, what we claim as new and desire to secure by Letters Patent is as follows:

1. A method to analyze and transform a computer program so that the information can be used to reduce the overhead of allocation and deallocation of objects in the program, said method comprising the step of identifying those objects allocated on a heap that can instead be allocated on a stack frame of a procedure, without changing the semantics of a computer program by performing an interprocedural analysis of said computer program, wherein said identifying step further comprises the steps of:
   identifying for each procedure analyzed, reachability relationships among different objects, fields of objects, and pointers referenced in each said procedure; and
   identifying an object as stack-allocatable for each object allocated in a procedure, if at the end of said procedure, it is not reachable from any global variable, parameter of said procedure, or return value of said procedure.

2. A method as recited in claim 1, further comprising the steps of:
   using stack allocation for a stack-allocatable object in place of heap allocation in later passes of a compiler; and
   reclaiming automatically storage for said identified objects when said procedure, on whose stack frame said identified objects were allocated, returns.

3. A method as recited in claim 1, wherein said interprocedural analysis further comprises the steps of:
   performing a bottom-up traversal over a call graph of said computer program; and
   computing summary reachability information for a callee procedure, updating said reachability information for actual parameters, return value and variables reachable from those parameters and return values at a call site within said caller procedure.

4. A method as recited in claim 3, wherein the step of performing a bottom-up traversal over a call graph with cycles is done iteratively until a fixed point solution is obtained.

5. A method as recited in claim 3, wherein an upper limit on iterations is imposed on the step of performing a bottom-up traversal over a call graph with cycles, allowing said interprocedural analysis to complete prior to obtaining a fixed point solution.

6. A method as recited in claim 3, wherein the step of computing summary reachability relationships among variables correctly handles exceptions in said computer program by selectively modifying information about previous reachability relationships among program variables.

7. A method as recited in claim 3, wherein the step of computing summary reachability relationships among variables interprocedurally for said computer program summarizes effects of a procedure invocation for different calling contexts using a single summary representation.

8. A method as recited in claim 1, wherein said interprocedural analysis skips the analysis of at least one procedure.

9. A method as recited in claim 8, wherein type information about program variables is used to improve the quality of information about reachability relationships among objects visible to said at least one procedure that is not analyzed.

10. A method as recited in claim 1, wherein said computer program is written in an imperative language that allows destructive updates of variables.

11. A method as recited in claim 1, wherein said computer program is written in a language with constructs that support multithreading.

12. A machine readable medium containing code to analyze and transform a computer program so that the information can be used to reduce the overhead of allocation and deallocation of objects in the program, the code implementing the step of identifying those objects allocated on a heap that can instead be allocated on a stack frame of a procedure, without changing the semantics of a computer program by performing an interprocedural analysis of said computer program, wherein said identifying step further comprises the steps of:

identifying for each procedure analyzed, reachability relationships among different objects, fields of objects, and pointers referenced in each said procedure; and identifying an object as stack-allocatable for each object allocated in a procedure, if at the end of said procedure, it is not reachable from any global variable, parameter of said procedure, or return value of said procedure.

13. A machine readable medium containing code to analyze and transform a computer program, as recited in claim 12, the code further implementing the steps of:

using stack allocation for a stack-allocatable object in place of heap allocation in later passes of a compiler; and reclaiming automatically storage for said identified objects when said procedure, on whose stack frame said identified objects were allocated, returns.

* * * * *